United States Patent Office 3,450,687
Patented June 17, 1969

3,450,687
LOWER ALKANOYL ESTERS OF POLYMYXIN ANTIBIOTICS
Donald C. Hobbs, Niantic, Conn., assignor to Chas. Pfizer & Co., Inc., New York, N.Y., a corporation of Delaware
No Drawing. Filed Feb. 24, 1966, Ser. No. 529,638
Int. Cl. C07g *11/00, 7/00;* A61k *21/00*
U.S. Cl. 260—112.5                                5 Claims

ABSTRACT OF THE DISCLOSURE

Oxygen-di-substituted derivatives of polymyxin of the formula:

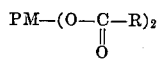

wherein PM is the dedihydroxy radical of Polymyxin B or E, R is alkyl of from 1 to 3 carbon atoms and the pharmaceutically acceptable N-acid addition salts thereof and their improved biological activity.

---

This invention relates to polymyxin derivatives and more particularly to oxygen di-substituted derivatives of polymyxin.

The polymyxins are a group of polypeptide antibiotics which are effective against a wide variety of gram negative organisms. Some of the outstanding attributes of these antibiotics are antibacterial spectrum, low allergenicity, bactericidal properties and slow development of resistant strains. Despite these desirable advantages, their use is limited to a certain extent by toxicity, primarily in the kidney.

It is evident therefore that if this drawback, i.e. nephrotoxicity, could be removed or reduced, relatively desirable products by comparison could be supplied.

It has now unexpectedly been found that converting the free hydroxy groups in the polymyxin molecule into ester derivatives while leaving the amino groups unreacted, or in the form of N-acid addition salts, leads to products which are free, or substantially divorced, of the aforedescribed nephrotoxicity factor. Furthermore, the resulting products advantageously retain their high activity particularly against gram negative organisms.

Polymyxin can be of various types, such as A, B, C, D, E, M etc. For the purposes of this invention, Polymyxins B and E are preferred. Polymyxin E is also known more commonly as Colistin. Both possess five free amino groups and two free hydroxy groups. The present invention relates to the conversion of those two free hydroxy groups to various esters functions to provide the novel compounds disclosed herein. More particularly, this invention relates to oxygen di-substituted derivatives of polymyxin of the general formula:

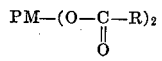

wherein PM is the dedihydroxy radical of Polymyxin B and E, R is alkyl of from 1 to 3 carbon atoms and the phermaceutically acceptable N-acid addition salts thereof.

The compounds of this invention are prepared by reacting said two free hydroxyls with an acid such as acetic, propionic and butyric, normal or branched, under esterifying conditions to yield the corresponding ester derivatives. Despite the fact it might appear that any standard esterification method could be utilized, this is not the case here since the free amino groups must not be affected by the esterifying agent. For this reason, selective methods are essential to provide the compounds of this invention.

One such method involves reacting the polymyxin base with a sufficient amount of carbobenzoxy chloride in order to form the corresponding penta carbobenzoxy derivative. This essentially protects the free amino groups, leaving only the hydroxy groups open for subsequent reaction. Said hydroxy groups are then esterified, for example, by treating with acetic anhydride or acetyl chloride, to provide the appropriate di-O-acetyl derivative. Similarly, the di-O-propionyl- and di-O-butyryl derivatives can be prepared using propionyl and butyryl chloride respectively. The CBZ blocking groups are easily removed by treating the resulting derivatives with dry hydrogen bromide in nitromethane to furnish the desired products.

Another suitable esterification method relates to a method whereby the hydroxy groups are converted directly and selectively without need for initial protection of the amino groups. It consists of acylating the hydroxy groups in a strong acidic medium such as trifluoroacetic or perchloric acids. This technique is also suitable for preparing the di-O-acetyl-, di-O-propionyl and the di-O-butyryl-polymyxin derivatives.

Of course, once the desired compounds are obtained, it is an easy matter to convert such compounds to their corresponding N-acid addition salts and such salts are within the scope of this invention. For instance, the di-O-acetyl polymyxin B product can be converted to its corresponding sulfate salt by the addition of an equivalent amount of sulfuric acid. Generally the reaction is carried out in an aqueous solution or in a suitable organic solvent such as methanol or ethanol. When such salts are to be used in animals, the acids used must be those which form non-toxic acid addition salts. Exemplary of such organic salts are those with maleic, fumaric, benzoic, ascorbic, pamoic, succinic, methanesulfonic, acetic, propionic, tartaric, salicylic, citric, gluconic, lactic, malic, aspartic, itaconic and glutamic acids. Exemplary of such inorganic salts are those with hydrochloric, hydrobromic, sulfuric, sulfamic, phosphoric and nitric acids.

Biological evaluation of the novel compounds of this invention consisted of four experimental testing methods. Specifically, they include:

(1) An in vivo antibacterial activity study,
(2) An acute toxicity study,
(3) A serum level study, and
(4) A nephrotoxicity study.

The results obtained in each instance indicated products having distinct improvement and effectiveness.

The following examples are provided by way of illustration and should not be interpreted as limiting the invention, many variations of which are possible without departing from the spirit or scope thereof.

Example I.—Carbobenzoxy Polymyxin B

Polymyxin B sulfate (146 g., 100 mmoles) is dissolved in 8 liters of $H_2O$. Tetrahydrofuran (2 liters) is then added and the pH of the resulting mixture adjusted to about 9.0 by addition of 1 N NaOH. A mixture containing carbobenzoxy chloride (96 g., 575 mmoles) and 400 ml. of tetrahydrofuran is then added over a 1 hour period maintaining the pH of the resulting mixture at 9.5 (590 ml. 1 N NaOH required).

The product which precipitates is filtered, washed with $H_2O$-THF mixture (4:1), washed with water and then dried to give 176 g. (77%) of product.

Example II

Carbobenzoxy Polymyxin E is prepared following the procedure of Example I wherein equivalent amounts of Polymyxin E is used in lieu of Polymyxin B with comparable results.

Example III.—Di-O-acetyl Polymyxin B

To a mixture containing carbobenzoxy Polymyxin B (16 g.), dimethyl-formamide (500 ml.) and water (150 ml.) maintained at 5° C. is added a tetrahydrofuran solution of acetyl chloride over a 1 hour period with stirring. After said 1 hour period the pH of the resulting mixture is adjusted to 8.5 by adding 0.2 N NaOH and stirring continued for 1 more hour. The product which precipitates is filtered, dried and dissolved in 100 ml. of nitromethane. Thru this solution is passed HBr for 5 minutes, followed by stirring for 2 hours at room temperature. The precipitate is filtered, dissolved in water and the pH is adjusted to a pH of 10 with the addition of NaOH. The precipitate, di-O-acetyl Polymyxin B is filtered and dried to give a substantial yield of product.

Example IV

The procedure of Example III is repeated wherein equivalent amounts of carbobenzoxy Polymyxin E is used in place of carbobenzoxy Polymyxin B and the corresponding products di-O-acetyl Polymyxin E is obtained in substantial yields.

Example V.—Di-O-propionyl Polymyxin B

The procedure of Example III is repeated wherein an equivalent amount of propionyl chloride is used in place of acetyl chloride and substantial yield of the corresponding di-O-propionyl compound is produced.

Example VI.—Di-O-butyryl Polymyxin B

The procedure of Example III is repeated wherein an equivalent amount of n-butyryl chloride is used in place of acetyl chloride and substantial yield of the corresponding di-O-butyryl compound is produced.

Example VII.—Di-O-acetyl Polymyxin B sulfate

To a methanolic solution containing di-O-acetyl Polymyxin B (1 M) is added a stoichiometric equivalent amount of sulfuric acid. The resulting solution is subsequently stripped free of solvent and the precipitate, N-acid addition salt, is filtered and dried.

The same procedure can be utilized to prepare the corresponding sulfate salts of di-O-porpionyl Polymyxin B, di-O-butyryl Polymyxin B and their corresponding Polymyxin E derivatives.

In general, the oxygen di-substituted derivatives of Polymyxin B and E may be converted to their acid addition salts in the following manner: to a methanolic solution containing said polymyxin derivative (1 M) is added a stoichiometric equivalent amount of a suitable acid. The resulting solution is subsequently stripped free of solvent and the product which precipitates is filtered and dried. Other suitable solvents, for example, ethanol, water or mixtures thereof may be utilized. The following acid addition salts are typical examples prepared by the above said procedure:

| Polymyxin derivative | Acid | Product |
|---|---|---|
| Di-O-acetyl polymyxin B | HBr | Di-O-acetyl polymyxin B hydrobromide. |
| Di-O-acetyl polymyxin E | HI | Di-O-acetyl polymyxin E hydroiodide. |
| Di-O-propionyl polymyxin B. | Citric | Di-O-propionyl polymyxin B citrate. |
| Di-O-butyryl polymyxin E | HCl | Di-O-butyryl polymyxin E hydrochloride. |

Example VIII.—Di-O-acetyl Polymyxin B

To cooled trifluoroacetic acid (20 ml.) is added 4.0 g. of Polymyxin B (base) followed by the addition of 1.0 g. of acetic anhydride. The resulting mixture is stirred at 5° C. for 30 min., poured into an ice-water mixture, and the pH adjusted to 10 by the addition of NaOH. The product which precipitates is washed and dried to give a substantial amount of product.

Example IX.—Di-O-acetyl Polymyxin B hydrochloride

A solution of 40.0 g. of Polymyxin B base in 200 ml. of 6 N HCl in admixture with 200 ml. glacial acetic acid is adjusted to 5° C. and 800 ml. of acetyl chloride is then added over a 30 minute period. The reaction temperature is then allowed to rise to 10° C. at which point the reaction mixture is poured into a container of diethyl ether. The precipitated product is filtered, washed and dried to give 44.4 g. (91% yield) of product.

*Analysis.* — Calc'd for $C_{60}H_{102}O_{15}N_{16} \cdot 5HCl$: C, 49.02%; H, 7.33%; N, 15.24%; Cl, 12.06%; acetyl, 5.86; Van Slyke, 0; amino nitrogen, 4.77; ash, 0. Found: C, 49.23%; H, 7.22%; N, 13.97%; Cl, 12.25%; acetyl, 5.99; Van Slyke, 0; amino nitrogen, 5.76; ash, 0.99.

Example X.—Biological evaluation (I) In vivo antibacterial activity: groups of mice are infected with *Escherichia coli* and treated subcutaneously with varying amounts of di-O-acetyl Polymyxin B hydrochloride. The $PD_{50}$ (dose which protects half the animals) was calculated to be 6.25 mg. per kg. body weight. The corresponding value for Polymyxin B sulfate is 2.1 mg./kg.

(II) Acute toxicity: groups of mice are treated intraperitoneally with varying doses of di-O-acetyl Polymyxin B hydrochloride. The $LD_{50}$ (dose which kills half the animals) was calculated to be 59 mg./kg. whereas the corresponding for Polymyxin B sulfate is 66 mg./kg.

(III) Serum levels: groups of mice are given subcutaneous doses of 25 mg./kg. of di-O-acetyl Polymyxin B hydrochloride and serum is withdrawn at different intervals. The extent to which these sera could be diluted and still retain antibacterial activity against *Pseudomonas aeruginosa* was used as a measure of the concentration of the antibiotic in the serum as shown below:

Di-O-acetyl polymyxin B
Sample time (hr.): hydrochloride salt
0.5 _____ 1–32 (1 part serum+31 parts diluent).
1 _____ 1–64 (1 part serum+63 parts diluent).
2 _____ 1–64 (1 part serum+63 parts diluent).
3 _____ 1–32 (1 part serum+31 parts diluent).

(IV) Nephrotoxicity: separate groups of female rats are given subcutaneous injections of di-O-acetyl Polymyxin B hydrobromide (I Hydrobormide) and Polymyxin B sulfate in identical doses ranging from 0.1 mg./animal on the first day to 10 mg./animal on day 15. On days 5, 10 and 15, urine is examined for glutamic oxalacetic transaminase (UGOT) and lactic dehydrogenase (ULDH) levels. Elevated excretion of these enzymes is a sensitive indicator of kidney damage.

|  | UGOT, units/8 hrs. | | ULDH, units/8 hrs. | |
|---|---|---|---|---|
|  | I hydrobromide | Polymyxin B sulfate | I hydrobromide | Polymyxin B sulfate |
| 5 days | 50 | 76 | 17 | 331 |
| 10 days | 91 | 40 | 66 | 763 |
| 15 days | 46 | 303 | 3,040 | 1,114 |

It will be noted that the UGOT levels in the Polymyxin B sulfate treated animals are elevated after 15 days while those of the I Hydrobromide animals are normal throughout the interval. The ULDH levels are also elevated in the Polymyxin B sulfate animals as early as 5 days after initiation of treatment whereas they rise in the I Hydrobromide animals only after 15 days.

Eighty percent of the Polymyxin B sulfate animals died; none of the I Hydrobromide animals died. Terminal kidney weight was normal in the I Hydrobromide animals but elevated in the Polymyxin B sulfate animals. Blood urea nitrogen levels in the Polymyxin B sulfate animals were elevated, indicative of nephrotoxicity; the levels were normal in the I Hydrobromide animals.

What is claimed is:

1. Derivatives of polymyxin selected from the group consisting of those of the formula:

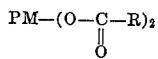

wherein PM is the dedihydroxy radical of Polymyxin B and E, R is alkyl of from 1 to 3 carbon atoms and the pharmaceutically-acceptable N-acid addition salts thereof.

2. The hydrochloride salt of claim 1 wherein R is $CH_3$ and PM is the dedihydroxy radical of Polymyxin B.

3. The sulfate salt of claim 1 wherein R is $CH_3$ and PM is the dedihydroxy radical of Polymyxin B.

4. The hydrobromide salt of claim 1 wherein R is $CH_3$ and PM is the dedihydroxy radical of Polymyxin B.

5. The hydrochloride salt of claim 1 wherein R is $CH_3$ and PM is the dedihydroxy radical of Polymyxin E.

References Cited

UNITED STATES PATENTS 2,599,950  6/1952  Stansly et al. _____ 195—96

FOREIGN PATENTS

35/9,313  7/1960  Japan.

LEWIS GOTTS, *Primary Examiner.*

MELVYN M. KASSENOFF, *Assistant Examiner.*